US009183745B2

(12) United States Patent
Huber et al.

(10) Patent No.: US 9,183,745 B2
(45) Date of Patent: Nov. 10, 2015

(54) METHOD FOR REGULATING THE DISTANCE OF A VEHICLE FROM A PRECEDING VEHICLE

(71) Applicant: MAN Truck & Bus AG, Munich (DE)

(72) Inventors: Martin Huber, Munich (DE); Karlheinz Doerner, Karlsfeld (DE); Daniel Heyes, Munich (DE); Stefan Jerg, Munich (DE); Peter Drimml, Dachau (DE); Andreas Zimmermann, Munich (DE)

(73) Assignee: MAN TRUCK & BUS AG, Munich (DE)

( * ) Notice: Subject to any disclaimer, the term of this patent is extended or adjusted under 35 U.S.C. 154(b) by 0 days.

(21) Appl. No.: 14/295,628

(22) Filed: Jun. 4, 2014

(65) Prior Publication Data

US 2015/0019117 A1   Jan. 15, 2015

(30) Foreign Application Priority Data

Jul. 11, 2013 (DE) .......................... 10 2013 011 549

(51) Int. Cl.
*G08G 1/052* (2006.01)
*B60W 30/16* (2012.01)

(52) U.S. Cl.
CPC ............... *G08G 1/052* (2013.01); *B60W 30/16* (2013.01)

(58) Field of Classification Search
USPC .......................................................... 701/119
See application file for complete search history.

(56) References Cited

U.S. PATENT DOCUMENTS

| 6,256,574 | B1 | 7/2001 | Prestl et al. | |
| 6,990,401 | B2 * | 1/2006 | Neiss et al. | 701/96 |
| 8,442,735 | B2 * | 5/2013 | Hrovat et al. | 701/70 |
| 8,784,267 | B2 * | 7/2014 | Staudinger et al. | 477/175 |
| 2002/0069010 | A1 | 6/2002 | Nishira et al. | |
| 2006/0293841 | A1 * | 12/2006 | Hrovat et al. | 701/205 |
| 2012/0123658 | A1 | 5/2012 | Kagawa | |
| 2012/0123659 | A1 | 5/2012 | Sato et al. | |

(Continued)

FOREIGN PATENT DOCUMENTS

| DE | 19804641 A1 | 8/1999 |
| DE | 10 2006 003 625 A1 | 8/2007 |
| DE | 10 2008 023 135 A1 | 11/2009 |

(Continued)

*Primary Examiner* — Thomas Tarcza
*Assistant Examiner* — Alex C Dunn
(74) *Attorney, Agent, or Firm* — Lucas & Mercanti, LLP

(57) ABSTRACT

A method for regulating a distance of a vehicle from a preceding vehicle (vehicle ahead) based on available information for the subject vehicle's speed, for the distance and for the speed of the vehicle ahead and on data regarding route information includes determining a fuel-saving situation for a fuel saving momentum utilization phase, and precomputing a consumption optimal speed profile for undisturbed travel. The method further precomputes an additional separation requirement to the vehicle ahead that is required to be able to fully implement the momentum utilization phase, and builds up the required additional separation prior to the fuel-saving situation, wherein the additional separation is built up, preferably substantially uniformly, over a separation build-up distance that is longer than the precomputed momentum utilization phase distance and/or is built up with a driver-acceptable, convoy-stabilizing, defined small speed reduction relative to the current speed of the vehicle. The momentum utilization phase on reaching the fuel-saving situation.

19 Claims, 2 Drawing Sheets

(56) References Cited

U.S. PATENT DOCUMENTS

2013/0041576 A1* 2/2013 Switkes et al. ............... 701/123
2014/0088810 A1* 3/2014 Gehring et al. ............... 701/22
2014/0371974 A1* 12/2014 Huelsebusch et al. .......... 701/23

FOREIGN PATENT DOCUMENTS

| DE | 10 2008 035 944 A1 | 4/2010 |
| DE | 11 2009 005 105 T5 | 9/2012 |
| EP | 2461304 A1 | 6/2012 |

\* cited by examiner

METHOD FOR REGULATING THE DISTANCE OF A VEHICLE FROM A PRECEDING VEHICLE

CROSS-REFERENCE TO RELATED APPLICATIONS

This application claims the priority of DE 10 2013 011 549.3 filed Jul. 11, 2013, which is incorporated by reference herein.

BACKGROUND OF THE INVENTION

The invention relates to a method for regulating the distance of a vehicle from a preceding vehicle (vehicle ahead).

With vehicles, especially with commercial vehicles, the momentum of the vehicle can be advantageously used to reduce the fuel consumption. For this purpose, in suitable situations an increase in speed or a reduction in speed is carried out. The generally applicable background of said measure is to avoid braking and in return to reduce the length and intensity of a drive phase. Here the momentum of the vehicle is used in a road section lying at the end or start of a drive phase.

Such a utilization of momentum can take place individually by a corresponding driving style of a driver. An improved utilization of momentum is, however, achieved by automation using a driver assistance system in connection with a speed regulation system, e.g. as is known from DE 10 2008 023 135 A1. Relevant situations for a momentum utilization phase are determined in advance with road route information, which is provided in the vehicle by an extended navigation system. Such situations can arise from the topography, for example increasing downhill gradient, end of gradient, tight bend, etc. or from the knowledge of the road infrastructure, for example the start of a village, the start of a speed limit, etc. Furthermore, situations can be derived from the objective of operating the vehicle in relation to the topography and the road infrastructure at an optimal operating point for consumption and wear. Suitable optimizing measures for this purpose are known, for example from DE 10 2008 035 944 B4.

If the speed profile of vehicles that use a saving situation is compared with vehicles travelling at constant speed, depending on the saving situation there is a difference of the speed profiles and hence also a variation of the separation of the vehicles from each other. Therefore, for a full utilization of a saving situation by a vehicle it is necessary that there is sufficient distance to a vehicle ahead. For this purpose a method for the special situation of a build-up of momentum prior to a gradient is already known from DE 10 2006 003 625 A1, with which it is provided that there is such a large distance available ahead that an increased speed necessary for the utilization of momentum does not result in too short a distance to the vehicle ahead. Here an adjustment of the target distance to the vehicle ahead is carried out on the basis of topography information prior to gradients during distance regulation. Specific information, especially how large and how long in advance thereof an additional separation should be built up, is not given here. Particularly the type and manner of the build-up of the additional separation and its length are, however, essential for acceptance of an automated driving mode with a momentum utilization phase, especially in connection with the following traffic and the effects on behaviour in convoy traffic.

SUMMARY OF THE INVENTION

An object of the invention is to provide a method for quantitative determination of a separation build-up for a momentum utilization phase and to ensure an acceptable, traffic calming and hence convoy traffic-stabilizing method for the following traffic.

The method according to the invention for regulating the distance of a vehicle from a preceding vehicle (vehicle ahead) is based on available information for the current speed of the vehicle, the distance and speed of the vehicle ahead, and on data of road route information, especially gradient data of the course of the route ahead, and is characterized by the following steps of the method:

a) Determining a fuel-saving situation for a possible fuel-saving momentum utilization phase in the course of the route ahead, b) precomputing a consumption-optimal speed profile with an associated speed variation and an associated momentum utilization phase distance for undisturbed travel, c) precomputing an additional separation requirement to the vehicle ahead based on the speed variation and the momentum phase distance that is necessary to be able to fully carry out the precomputed fuel-saving momentum utilization phase, but without a defined, excessively close approach to the vehicle ahead, d) building up the required additional separation prior to the fuel-saving situation, wherein the additional separation is built up, preferably substantially uniformly, over a separation build-up distance that is longer than the precomputed momentum utilization phase distance and/or with a defined small reduction in speed relative to the current speed of the vehicle that is acceptable to the driver and that is traffic-stabilizing, e) carrying out the fuel-saving momentum utilization phase on reaching the fuel-saving situation.

In the first step (a) of the method, situations that are relevant to saving fuel with utilization of the speed variation and hence that are critical in relation to an excessively small distance from the preceding vehicle, are identified by rules. Such significant, consumption-critical situations as fuel-saving situations are as follows:

—Start of Downhill Gradient

The downhill gradient increases, so that the subject vehicle can gather speed solely by coasting in engine drag mode or with the clutch decoupled. In this situation a more fuel-saving speed algorithm slows the vehicle early and allows it to go faster again on a greater downhill slope by means of the downhill force alone.

—End of Downhill Gradient

The gradient decreases, so that the vehicle, which is travelling downhill under braking, can carry forward the available momentum, possibly also the momentum increased by means of a temporary increase in speed, as fully as possible into the following drive phase.

—Coasting

Because of known special features of the route, such as for example a tight bend or motor-way exit, a reduction of the allowed maximum speed or a place sign, etc., timely coasting is advantageous for a reduction of the fuel consumption.

—Start of Uphill Gradient

The speed is specifically increased and momentum is built up before uphill gradients, so that the decrease in speed over the incline distance is very small in the case of insufficient drive power.

—Travelling Uphill

When travelling uphill the points in time of gearbox changes are specified so that for example very few changing operations are required on a hill and so that very little fuel is consumed. The critical situations are in this case the sections with minimum speed, especially if falling below said speed would cause a downshift by itself.

If in the first step (a) of the method one of the above situations is determined in advance, in the second step (b) of the method precomputation of a consumption-optimal speed profile with an associated speed variation and an associated momentum utilization phase distance is carried out as if the vehicle could travel unaffected by leading vehicles and could utilize a saving situation fully and unimpaired. Such precomputations are known, for example from DE 10 2008 023 135 A1.

In the third step (c) of the method, the impairment of a momentum utilization phase by a vehicle ahead is taken into account during the precomputation by determining an additional separation required to the vehicle ahead based on the speed variation and the momentum phase distance that are required to be able to fully carry out the precomputed fuel-saving momentum utilization phase in step (b) of the method but without approaching too close to the vehicle ahead. The value of a required additional separation, which together with the current separation allows full utilization of momentum on reaching the saving situation, is thus determined with step (c) of the method.

In step (d) of the method, in driving mode the determined additional separation is essentially built up before the fuel-saving situation over a separation build-up distance, wherein said separation build-up distance is longer than the precomputed momentum utilization phase distance and/or the additional separation is built up with a small reduction in speed relative to the current speed of the vehicle that is acceptable to the driver and that is speed-stabilizing. After said additional separation has been built up by a suitable algorithm in the distance regulation means, the momentum utilization phase is carried out in step (e) of the method as precomputed for undisturbed travel on reaching the fuel-saving situation.

By using the above type of build-up of the required additional separation, it is achieved that there is no inappropriate distracting decrease in speed of the vehicle in evidence both for the driver and also for the following traffic. If the additional separation remains within an acceptable range, the following traffic is not affected. The claimed method thus enables predictive distance selection in order to be able to carry out fuel efficient speed variation both while driving in convoy and maintaining separation for diverse situations on the one hand, and in order on the other hand to increase the distance from the vehicle ahead only in a necessary situation and only to the necessary extent in order to be able to ensure a method for distance and speed that is acceptable to the driver. It is especially important with regard to convoy stabilization that the driver of a following vehicle accepts the behaviour of the automated system of a vehicle ahead and does not intervene to override, for example by starting to overtake, just because he does not recognize that the vehicle ahead is only driving more slowly temporarily for momentum utilization, but will then catch up with the convoy again.

For example, if the speed on a section of 1 km is reduced from 85 km/h by 1 km/h to 84 km/h, this results in a separation gain or additional separation of 12 m to the preceding vehicle. Ideally the driver does not notice the build-up of the additional separation or at least perceives it as not distracting. For a fuel saving situation with a length of 200 m, a separation is then available in order to increase the speed by 5 km/h or in order to be able to carry out the fuel-saving situation without braking in the event of unexpected braking of the vehicle ahead by 5 km/h. If the driver accepts said method without intervening, speed overshoots and speed reductions that provide advantages in relation to fuel saving only occur for the route situations determined as necessary. Other speed changes will be smaller as a result of the predictive separation build-up.

For the precomputation of an unimpaired, consumption-optimized speed profile in the momentum utilization phase according to step (b) of the method, the current speed of the vehicle is advantageously assumed to be the target speed imposed by the vehicle ahead.

In order to guarantee acceptable traffic-calming and convoy-stabilizing build-up of an additional separation, a separation build-up distance is proposed that is greater by a factor of 2 to 5 than the precomputed momentum utilization phase distance.

A corresponding driver-acceptable and convoy-stabilizing build-up of an additional separation is correspondingly also achieved if a reduction in speed in relation to the current speed of the vehicle for building up the additional separation takes place with 0.5 km/h to 4 km/h, preferably with 1 km/h.

In order to preventatively intercept unpredictable traffic influences, for example unpredicted braking of the vehicle ahead, and nevertheless to be able to utilize the full saving situation, the calculated additional separation requirement can be increased by an additional situation-dependent separation using another measure, so that a correspondingly increased additional separation is built up. Such a situation-dependent additional separation is preferably taken from a predefined table with situation-typical, situation-dependent additional separation values.

With a similar measure, a separation from the vehicle ahead is built up predictively for points in the route that offer potential fuel saving through the utilization of momentum, even if the subject vehicle's own momentum utilization phase, for example prior to the start of a downhill gradient, will contribute to increasing the distance (the distance is thus non-critical), thus even unpredictable driving behaviour of the vehicle ahead (for example by sudden braking) does not adversely affect the subject vehicle's own fuel-saving momentum utilization phase.

The additional separation requirement can be advantageously and simply determined from a speed and distance precomputation for the subject vehicle and the vehicle ahead on the assumption that the vehicle ahead is travelling at constant speed.

A constant speed and corresponding driving strategy of the vehicle ahead can be determined and taken into account on the basis of the measurement of the distance and the relative speed.

Alternatively, the additional separation requirement can be determined from a speed and distance precomputation for the subject vehicle and for the vehicle ahead assuming that the vehicle ahead is implementing and has activated a similar fuel-saving momentum utilization function to the subject vehicle. Such a driving strategy of the vehicle ahead can also be identified by corresponding measurements and can be taken into account during precomputations in separation-maintenance situations.

In this connection it should be noted that in a saving situation at a start of a downhill gradient the distance from the subject vehicle to a vehicle ahead would increase with a momentum utilization function, because the subject vehicle automatically reduces the speed prior to the start of the downhill gradient to save fuel. However, this is only the case if the vehicle ahead continues at constant speed. However, if the vehicle ahead also uses a similar fuel-saving momentum utilization function to the subject vehicle then a smaller relative distance will nevertheless temporarily occur, because the vehicle ahead reaches the saving situation earlier and hence reduces speed sooner. In this case an additional separation is thus also necessary so that the subject vehicle can fully utilize the momentum utilization function in the saving situation, as the following example for a start of a downhill gradient indicates:

Start of downhill gradient:
Route: level (0% gradient), then incline (−2.5% gradient) vehicle ahead uses the situation and coasts from 24 m/s to 22.5 m/s and back to 24 m/s,
Utilization of momentum: subject vehicle coasts identically to the vehicle ahead, i.e. from 24 m/s to 22.5 m/s and back to 24 m/s,
Separation: 50 m (at the point in time of the start of the situation)
Extent of the situation: 600 m
Separation requirement: 1.5 m/s*50 m/24 m/s=3.13 m Here there is approximately an additional separation requirement of only approx. 3 m.

If the vehicle ahead were travelling at a constant 24 m/s and the subject vehicle were utilizing momentum, there would be an increased distance of:

$$\tfrac{1}{2}*1.5\ m/s*600\ m/24\ m/s=19\ m$$

The determined additional separation requirement for the same utilization of momentum of both vehicles is thus approx. 3 meters. In order to preventatively intercept unpredictable traffic influences, a further additional separation of 4 meters for example is provided in this situation. Said additional separation can in the simplest case be held available by a table with typical separation values for each situation.

The build-up of separation may be deferred or reduced at points of the route that can be critical for a fuel-saving driving mode. For example, an advantageous division of the separation build-up could therefore be determined by an optimizing computation using a defined specified vehicle model.

Within the scope of the separation build-up, known vehicle properties, such as, for example, rolling resistance and drive power, can be taken into account in the precomputations.

In a further embodiment of the method a vehicle ahead sends its driving strategy to the vehicles within radio range by a data radio transmission and possibly other data that are used to decide the relevance of the data for the surrounding vehicles. A vehicle strategy thus associated with and relevant to the vehicle ahead can then be taken into account in the subject vehicle's own driving strategy. For a relevance decision at least the geoposition (GPS, Galileo) of the vehicle ahead must be transmitted therewith, possibly also the speed and direction of travel, wherein these can also be derived from a plurality of GPS transmissions with time stamps. Accordingly, the subject vehicle can also send its own driving strategy and other data to support cooperative driving to the vehicles within radio range.

BRIEF DESCRIPTION OF THE DRAWINGS

The invention will be explained further using figures.
In the figures.

DETAILED DESCRIPTION OF THE PREFERRED EMBODIMENTS

Figure 1A:
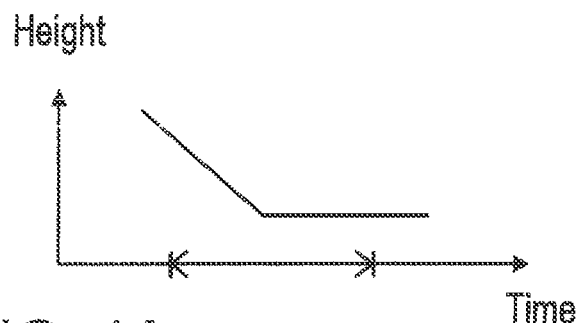
FIGS. 1A, 1B, and 1C are graphs showing variations of the height, of the speed and of the distance over the time of a momentum utilization phase according to an embodiment of the present invention.
Figure 1B:
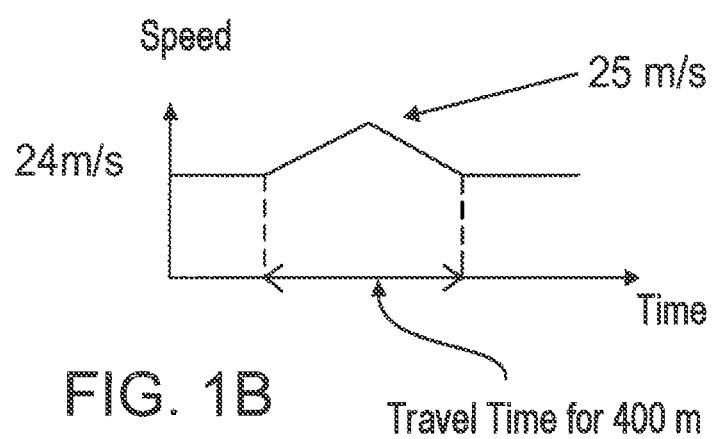
Figure 1C:
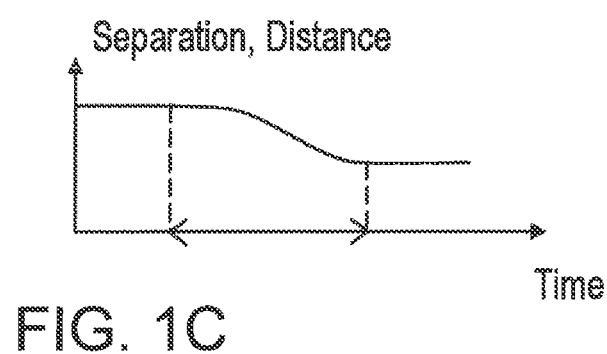

In FIGS. 1A, 1B, 1C, by way of example, a saving situation and momentum utilization phase at the end of a downhill gradient with the following conditions are illustrated:

End of downhill gradient:
Assumption: vehicle ahead is driving at a constant 24 m/s
Route: incline (−2.5% gradient), then level (0% gradient)
Utilization of momentum: from 24 m/s to 25 m/s and back to 24 m/s
Extent of the situation: 400 m Here there is approximately an additional separation requirement of:
Separation requirement: ½*1 m/s*400 m/24 m/s=8.3 m According to the driving strategy recorded by measurement or assumed, the vehicle ahead is driving at a constant 24 m/s. The topography of the route with its end of downhill gradient was for example recorded by means of GPS or is known in the subject vehicle by an extended navigation system, as illustrated schematically in FIG. 1A.

The utilization of momentum from 24 m/s to 25 m/s and back to 24 m/s as well as the extent of the situation of 400 m were precomputed for travel unaffected by a vehicle ahead using a known algorithm and are illustrated schematically in FIG. 1b.

This results in an additional separation requirement of 8.3 m as calculated, which was built up prior to the utilization of momentum situation and at the end of the saving situation was reduced back to the driver's desired target distance, as illustrated schematically in FIG. 1c.

Figure 2:
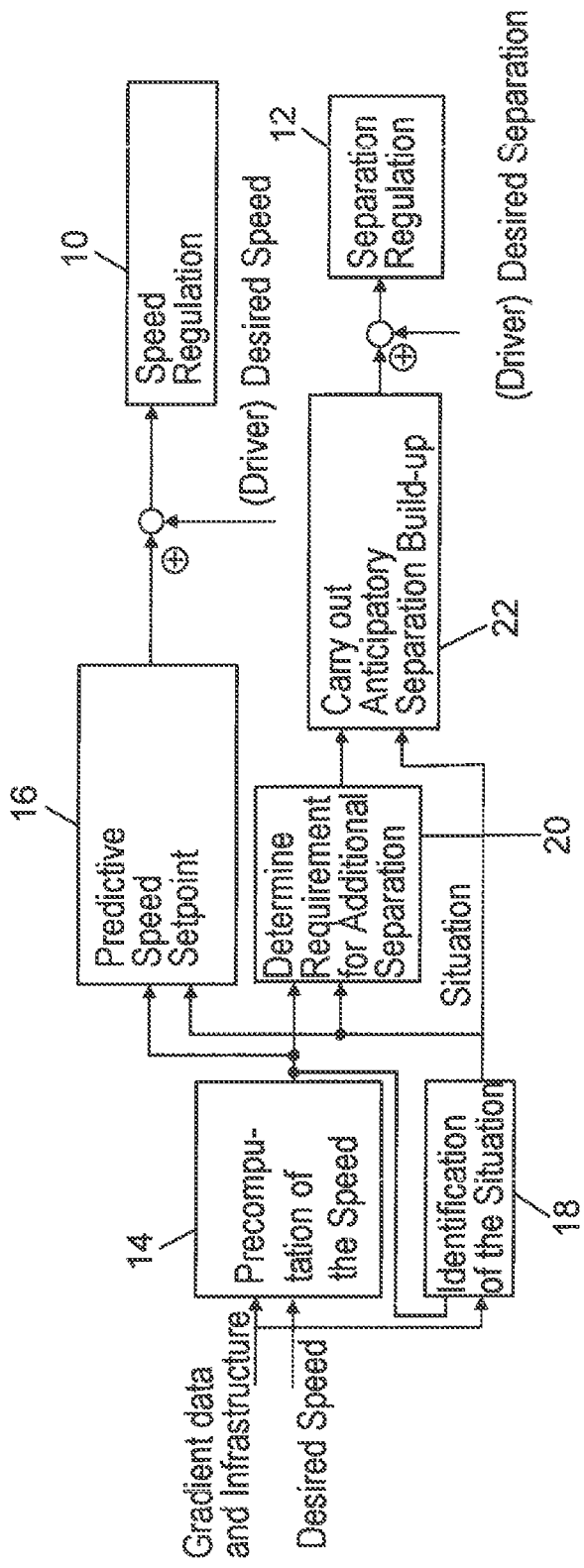
FIG. 2 is a block diagram of a regulation device for implementation of the method according to the invention.

From the block diagram according to FIG. 2 the elements and the interaction in a regulation device for implementing the method according to the invention are shown. The device contains the usual elements in commercial vehicles for speed regulation 10 and distance or separation regulation 12. Furthermore, it contains known elements of established methods for speed optimizing (for example according to DE 10 2008 023 135 A1), namely for precomputation of the speed 14 (based on the driver's wishes) and for a predictive speed setpoint 16.

The required new and additional elements for implementation of the method according to the invention are indicated in the corresponding blocks for
Precomputation of the speed 14 (based on a target speed which may be different from the drivers desired speed)
identification of a saving situation 18,
Determining the additional separation requirement 20, and
Anticipatory separation build-up 22.

The invention claimed is:
1. A method for regulating a distance of a first vehicle from a preceding vehicle, based on a vehicle speed of the first vehicle, the distance, a speed of the preceding vehicle, and data about road route information, the method comprising:
   determining a fuel-saving situation for a fuel-saving momentum utilization phase in the route ahead,
   precomputing a consumption optimal speed profile with an associated speed variation and an associated momentum utilization phase distance for undisturbed travel required to implement the fuel-saving momentum utilization phase,
   precomputing, based on the speed variation and the momentum utilization phase distance, an additional separation requirement to the preceding vehicle ahead that is required upon reaching the fuel-saving situation to fully implement the precomputed fuel-saving momentum utilization phase without a defined, excessively close approach to the preceding vehicle,
   building up the required additional separation prior to the fuel-saving situation, wherein the additional separation is built up over a separation build-up distance that is longer than the precomputed momentum utilization phase distance and/or with a driver-acceptable, convoy-stabilizing, defined small speed reduction relative to the current vehicle speed, carrying out, after building up the required additional separation, the fuel-saving momentum utilization phase on reaching the fuel-saving situation.

2. The method according to claim 1, wherein the additional separation is built up substantially uniformly over the separation build-up distance.

3. The method according to claim 1, further comprising the step of adopting a current speed of the first vehicle as a target speed imposed by the preceding vehicle ahead for precomputing an undisturbed consumption-optimized speed profile in the momentum utilization phase.

4. The method according to claim 1, wherein during said step of precomputing an additional separation requirement, the separation build-up distance is specified as greater by a factor of 2 to 5 than the precomputed momentum utilization phase distance.

5. The method according to claim 1, wherein the small speed reduction for building up the additional separation takes place with a speed reduction of 0.5 km/h to 4 km/h.

6. The method according to claim 1, wherein the small speed reduction is 1 km/h.

7. The method according to claim 1, wherein the additional separation requirement computed on the basis of the speed variation and the momentum phase distance is increased by a situation-dependent additional separation in order to be able to preventively intercept unpredictable traffic influences.

8. The method according to claim 7, wherein the situation-dependent additional separation is taken from a predefined table with situation-typical situation-dependent additional separation values.

9. The method according to claim 1, for the points on the route that offer fuel-saving potential by using momentum utilization, a separation from the preceding vehicle is built up predictively, even if the momentum utilization phase of the subject vehicle will contribute to the increase in separation, so that unpredictable driving behaviour of the preceding vehicle does not adversely affect the fuel-saving momentum utilization phase of the first vehicle.

10. The method according to claim 1, wherein the additional separation is determined from a speed and distance precomputation for the first vehicle and for the preceding vehicle assuming that the preceding vehicle is travelling at constant speed.

11. A method for regulating a distance of a first vehicle from a preceding vehicle, based on a vehicle speed of the first vehicle, the distance, a speed of the preceding vehicle, and data about road route information, the method comprising:

determining a fuel-saving situation for a fuel-saving momentum utilization phase in the route ahead, precomputing a consumption optimal speed profile with an associated speed variation and an associated momentum utilization phase distance for undisturbed travel, precomputing an additional separation requirement to the preceding vehicle ahead based on the speed variation and the momentum utilization phase distance required to fully implement the precomputed fuel-saving momentum utilization phase without a defined, excessively close approach to the preceding vehicle, building up the required additional separation prior to the fuel-saving situation, wherein the additional separation is built up over a separation build-up distance that is longer than the precomputed momentum utilization phase distance and/or with a driver-acceptable, convoy-stabilizing, defined small speed reduction relative to the current vehicle speed, carrying out the fuel-saving momentum utilization phase on reaching the fuel-saving situation, wherein the additional separation requirement is determined from a speed and distance precomputation for the first vehicle and the preceding vehicle assuming that the preceding vehicle is implementing and has activated a similar fuel-saving momentum utilization function to the first vehicle.

12. The method according to claim 1, wherein the separation build-up is interrupted or reduced at the points on the route that are critical for the subject vehicle with regard to a fuel-saving driving style.

13. The method according to claim 11, wherein the separation build-up is reduced in sections of the route with at least one of a defined lower engine speed, a defined lower and decreasing engine speed, and prior to a gearbox downshift.

14. The method according to claim 1, wherein a location, an extent, and a size of the momentum utilization phase are determined predictively and a scope of the separation build-up is determined therefrom, such that a speed precomputation is carried out on the basis of known vehicle properties of the subject vehicle.

15. The method according to claim 14, wherein speed precomputation is carried out on the basis of at least one of a rolling resistance and a drive power of the first vehicle.

16. The method according to claim 1, further comprising determining a driving strategy of the preceding vehicle based on the measurement of the separation and the relative speed to the preceding vehicle and taking into account the driving strategy of the preceding vehicle in subsequent situations.

17. The method according to claim 1, wherein the preceding vehicle sends its driving strategy to vehicles within radio range by radio data transmission and sends other data that are used to decide the relevance of the data for surrounding vehicles, and the first vehicle takes into account the driving strategy thus associated with and relevant to the preceding vehicle in the driving strategy for the first vehicle.

18. The method according to claim 1, further comprising sending, by the first vehicle, a driving strategy and other data for supporting cooperative driving by radio data transmission to vehicles within radio range.

19. A motor vehicle implementing a method according to claim 1.

* * * * *